June 23, 1959 E. S. SELMER 2,892,183

COINCIDENCE CONTROL APPARATUS

Filed Nov. 9, 1953 3 Sheets-Sheet 1

INVENTOR.
ERNST S. SELMER

BY James B. Christie

ATTORNEY

INVENTOR.
ERNST S. SELMER

BY James B. Christie

ATTORNEY

INVENTOR.
ERNST S. SELMER
BY James B. Christie
ATTORNEY

United States Patent Office 2,892,183

Patented June 23, 1959

2,892,183

COINCIDENCE CONTROL APPARATUS

Ernst S. Selmer, Oslo, Norway, assignor, by mesne assignments, to Burroughs Corporation, Detroit, Mich., a corporation of Michigan Application November 9, 1953, Serial No. 391,026

8 Claims. (Cl. 340—174)

Figure 1:
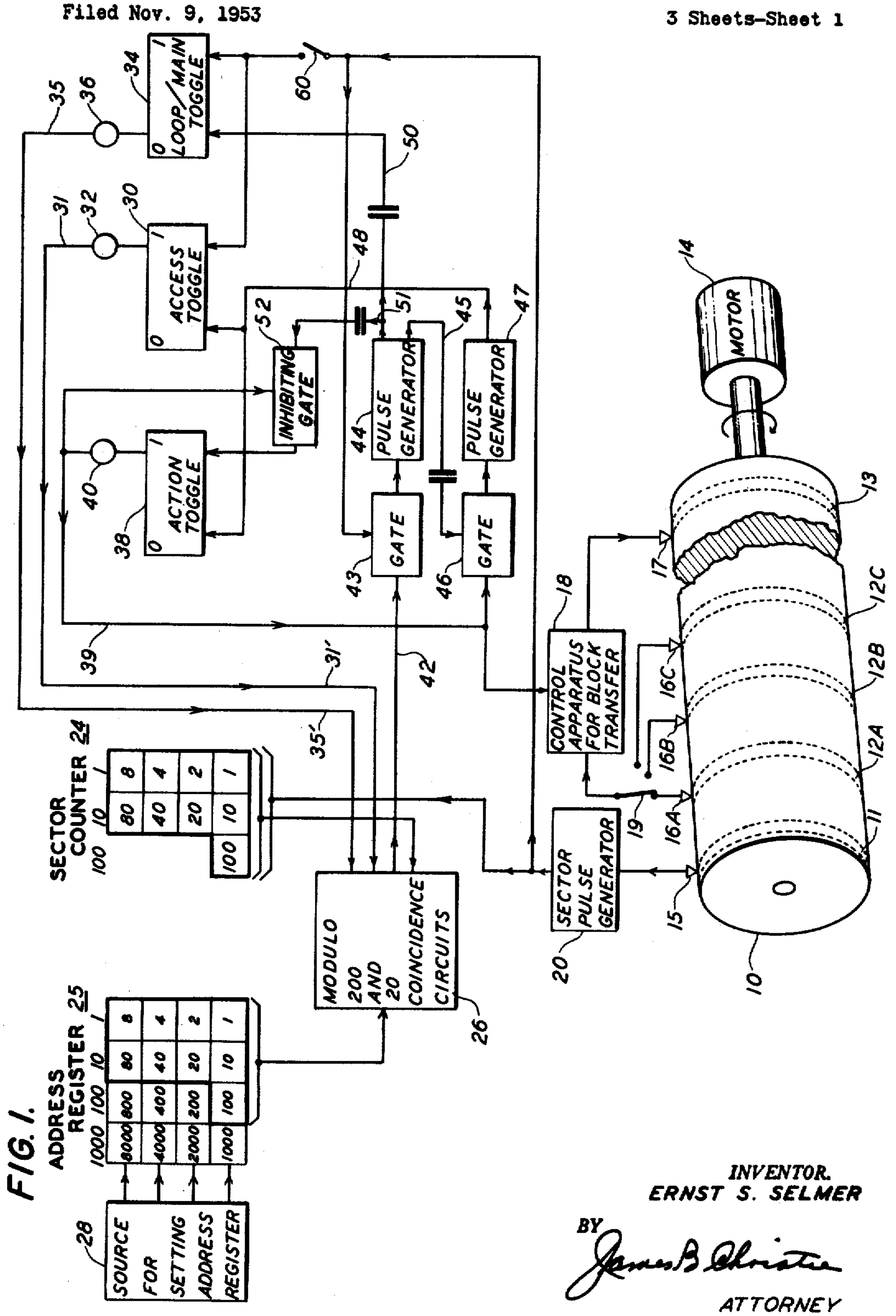

This invention relates to coincidence control apparatus, and it has particular reference to apparatus for selectively controlling the transfer of a predetermined block of information from a portion of a storage medium, such as a magnetic drum.

In various types of data handling arrangements, information is stored in blocks along a storage medium, and some arrangement must be provided for transferring selected blocks of the information from a selected portion of the storage medium to other locations.

By way of example, in many electronic computers information is first stored in a bulk or slow storage area on a rotating magnetic drum, and from time to time selected blocks of the information are transferred to a quick access storage area on the drum. The bulk storage area may comprise a plurality of bands each of which includes a plurality of separate channels which extend circumferentially around the drum, and the quick access area may comprise a single band which includes a plurality of channels.

In one type of system utilizing a rotating magnetic drum, each circumferential band in the bulk storage area is divided into a plurality of sectors or addresses, in each of which one "word" may be recorded. Each word sector ordinarily is the same length, and a plurality of digits may be recorded in each word space.

Each block of information which is to be transferred consists of the digits comprising the words which are recorded in a certain number of word sectors. The location of the information in the band is designated by its address, and the block of information to be transferred includes a selected number of words occupying addresses with sequentially follow a given address.

I have discovered that the transfer of a predetermined block of information can be controlled by coincidence control apparatus which serves both to locate a desired address and to count the number of words in a block of information to be transferred.

In accordance with my invention, a register is provided for registering the address of the first word of a selected block of information, a counter is provided for counting the successive addresses on the drum as it rotates, and coincidence circuit means is coupled to the register and to the counter for providing a first control signal when the count registered in the counter equals the number registered in the address register and for providing a second control signal when the count registered in the counter is a predetermined number greater than the number registered in the address register. The two control signals are employed to control electronic switching apparatus so that the selected block of information is transferred from the band during the interval of time between the two control signals, thereby effecting precise control over the number of words included in the block of information transferred.

The address register and the counter are each provided with flip-flops, i.e. bi-stable circuits for registering binary coded decimal representations of numbers in the 1, 2, 4, 8 system as follows:

*Table I*

| Number | Binary Code | | | |
|---|---|---|---|---|
| | 1 | 2 | 4 | 8 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

Initial coincidence is achieved when the actuated condition of all of the corresponding flip-flops in the two registers is the same, i.e., when the number registered in the counter equals the number registered in the address register. A second coincidence is achieved among part of the corresponding flip-flops in the two registers when the number registered in the counter is a predetermined number greater than the number registered in the address register.

For example, the counter may be arranged to count from 0 to 199 during each revolution of the magnetic drum by means of flip-flops representing the numbers 1, 2, 4, 8, 10, 20, 40, 80 and 100 to provide binary coded decimal representations of the numbers. Corresponding flip-flops may be provided in the address register, and the condition of all of the corresponding pairs of flip-flops may be compared until initial coincidence is achieved. Thereafter, the condition of the pairs of flip-flops representing the numbers 1, 2, 4, 8 and 10 may be compared until a second coincidence is achieved among that portion of the flip-flops. In this example, the second coincidence is achieved when the number registered in the counter is twenty greater than the number registered in the address register, thereby providing an indication that a block of twenty words has been transferred.

Such an arrangement responds to modulo 200 coincidence and then to modulo 20 coincidence. The invention may be employed to respond to coincidence based upon other moduli, if desired. For example, it may be employed to ascertain modulo 100 and then modulo 10 coincidence.

Also, the invention is not limited to use with an address register and a counter, but can be employed to compare numbers registered in various types of registering means.

Figure 3:
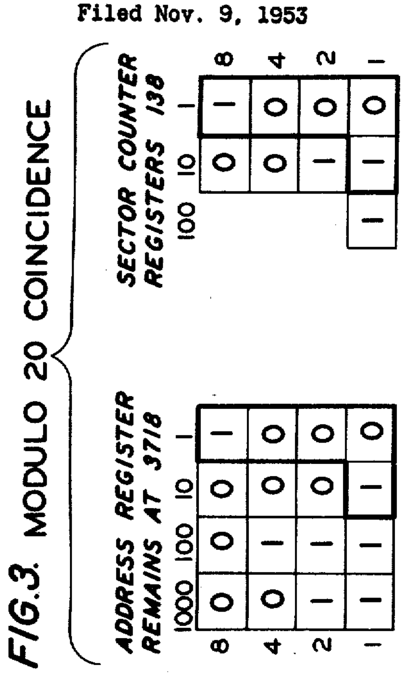
Figure 2:
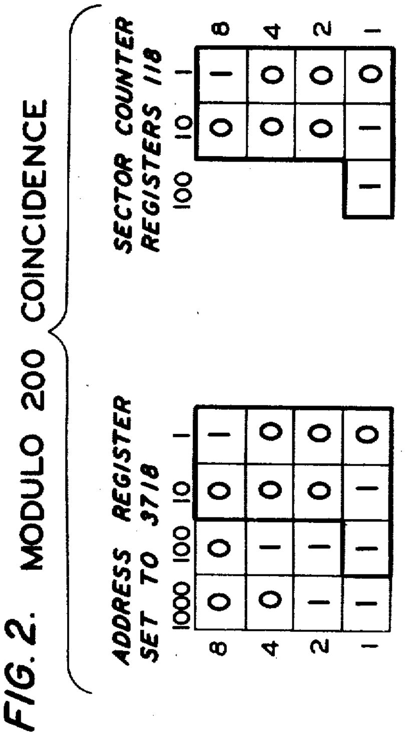
Figure 4:
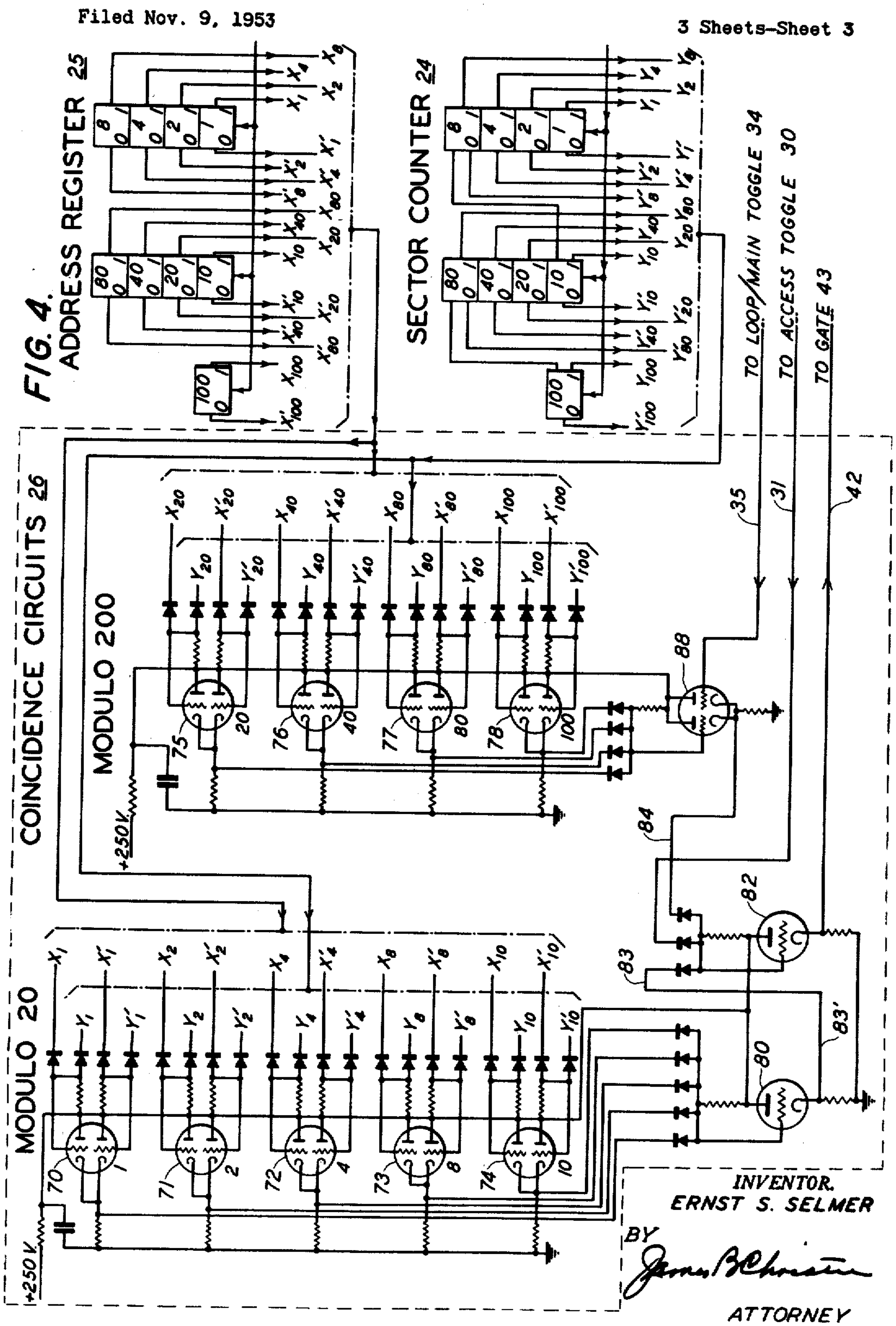

The invention is explained with reference to the drawings, in which:

Fig. 1 is a block diagram showing the coincidence control apparatus employed to control the transfer of a block of information from one area to another area on a magnetic drum;

Figs. 2 and 3 illustrate the conditions of the address register and the counter of Fig. 1 for modulo 200 and modulo 20 coincidence respectively;

Fig. 4 is a schematic diagram showing the coincidence circuits of Fig. 1; and

Figure 6:
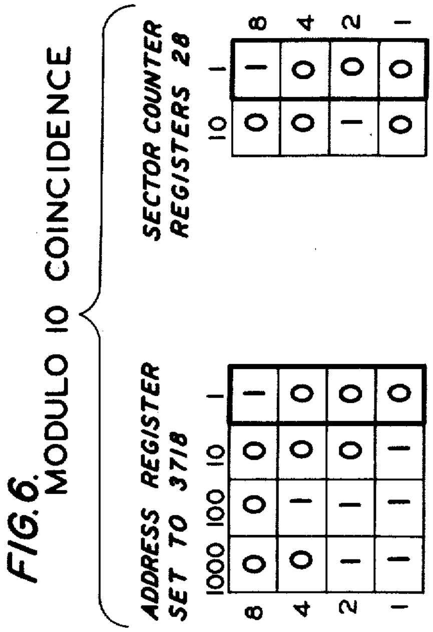
Figure 5:
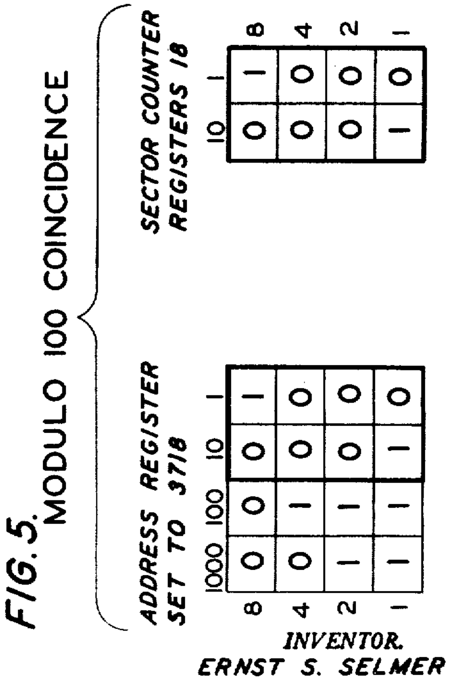

Figs. 5 and 6 illustrate the conditions of an address register and a counter for modulo 100 and modulo 10 coincidence.

Fig. 1 illustrates how the coincidence control apparatus may be employed to control the transfer of a block of information from one area on a magnetic drum to another area on the drum. By way of example, the information may be transferred from a bulk storage area to a quick access storage area for use in carrying out computations in a high speed electronic computer. The quick access storage may be arranged in the form of circulating loops, if desired.

The magnetic drum 10 has a control channel 11 in which a magnetic signal is provided to indicate each sector or address of stored information recorded in a plurality of bands 12A, 12B and 12C. Thus, the control channel 11 carries a number of magnetic signals equal to the number of sectors or addresses of stored information recorded in each of the other bands. In this embodiment of the invention 200 addresses are provided, and they are designated by the numbers 0 to 199.

The bulk storage area comprises a plurality of bands 12A, 12B, 12C, etc., extending around the drum, and the quick access area is a band 13. The drum is rotated at a constant speed by a suitable source of power, such as a motor 14.

A pickup 15 serves to sense the sector signals along the control channel 11, a plurality of transducers 16 are provided for sensing information in the respective bulk storage bands, and a transducer 17 is provided for recording information in the quick access band 13.

An electronic block transfer control apparatus 18 serves to control the interval of time during which information is transferred from one of the bulk storage bands 12 to the quick access band 13. A switch 19 is provided for selecting the band from which information is transferred. A mechanical switch 19 is illustrated in order to simplify the disclosure, although an electronic switching arrangement under the control of the address register may be employed in order to provide high speed operation.

A pulse generator 20 is coupled to the output of the sector pickup 15, and it provides electrical pulses corresponding to the magnetic signals in the control channel 11 on the drum. Thus, the pulse generator 20 produces 200 pulses per revolution of the drum 10. These pulses actuate the coincidence control apparatus so as to permit a selected block of information to be transferred from one of the bands 12 to the band 13.

The coincidence control apparatus comprises: a sector counter 24 which is coupled to the pulse generator 20 and which indicates the sector or address at which the pickup 15 is located at any given moment; an address register 25 in which a reference number is registered, indicating the address at which the first portion of the information to be transferred is located; coincidence circuits 26 for comparing the numbers registered in the address register and in the sector counter 24; and a plurality of flip-flops and gates for controlling the sequence of operations.

Both the sector counter 24 and the address register 25 are provided with flip-flops, such as bistable multivibrators, for providing a binary coded decimal system of notation.

For the modulo 200 arrangement illustrated, the sector counter is provided with nine flip-flops which continuously count from 0 to 199, and then repeat the count. The actuated condition of these flip-flops, and that of the nine corresponding flip-flops designated 1, 2, 4, 8, 10, 20, 40, 80 and 100 in the address register is compared in the coincidence circuits 26 to provide the initial control action. The coincidence circuits 26 will be described in detail later.

The address register illustrated is provided with four decades for registering a four-digit number. Since only the flip-flops representing 1, 2, 4, 8, 10, 20, 40, 80, and 100 need be employed to count from 0 to 199 to designate the sector of a given band, the remaining portion of the address register may be used to designate the selected portion or band of the bulk storage area, as well as to designate whether the bulk storage area or the quick access area is to be referred to.

The portion of the address register which is compared with the sector counter is enclosed in bold lines, and the remainder of the address register may be employed to control other functions such as operating band selector switch 19 and designating either loops or bulk storage area.

Numbers are shifted into the address register one at a time from a source 28 so that the successive digits of the number are registered in the respective decades in accordance with the binary coded decimal system of notation.

For example, if the information to be transferred is stored at address 3718, the 8 flip-flop of the units decade, the 10 flip-flop of the tens decade, the 400, 200 and 100 flip-flops of the hundreds decade, and the 2000 and 1000 flip-flops of the thousands decade are actuated, as shown in Fig. 2. The numerals 718 indicate that the information to be transferred is at sector address 118 because only the 100 flip-flop of the hundreds decade of the address register is sensed, and it is actuated when 700 is registered in this decade. Sensing of numerals higher than 200 in order to locate a sector address is unnecessary inasmuch as there are only 200 sector addresses in each band.

Thus, when the sector counter registers 118, its flip-flops are in the same actuated condition as the corresponding flip-flops of the address register, as illustrated in Fig. 2, and the modulo 200 coincidence circuit, to be described later, senses this condition of coincidence and produces a first control signal which appears on a lead 42. This control signal serves to initiate the block transfer of information through the block transfer control apparatus 18 and to alter the action of the coincidence circuits 26 so that only the modulo 20 portion of the circuits is operative.

The modulo 20 portion of the coincidence circuits 26, to be described later, senses the condition of the 1, 2, 4, 8 and 10 flip-flops in the address register and the counter, and it provides a second control signal on the lead 42, when these flip-flops are in the same condition of coincidence. The second control signal is employed to terminate the block transfer of information through the block transfer control apparatus 18 and to reset the coincidence control apparatus.

As illustrated in Fig. 3, modulo 20 coincidence occurs when the count registered in the sector counter has progressed to 138 in the example being considered. Thus, modulo 20 coincidence occurs when the count is 20 greater than the address, due to the fact that the condition of only a portion of the flip-flops of the address register and the counter is sensed the second time.

An access flip-flop 30 serves to activate the coincidence circuits 26 when the lead 31 which interconnects the flip-flop 30 and the coincidence circuits is at a high potential. A cathode follower 32 is employed between the flip-flop and the lead 31 in order to isolate the flip-flop from the coincidence circuits. The lead 31 is at a low potential when the flip-flop is set to its "0" condition, and the lead is at a high potential when the flip-flop is set to its "1" condition.

A loop/main flip-flop 34 serves to de-activate the modulo 200 coincidence circuit when the lead 35 which interconnects the flip-flop 34 and the coincidence circuits is at a high potential. The lead 35 is at a low potential when the flip-flop is set to its "1" condition, and the lead is at a high potential when the flip-flop is set to its "0" condition. A cathode follower 36 is employed between the flip-flop and the lead 35 in order to isolate the flip-flop and the coincidence circuits.

An action flip-flop 38 serves to permit the transfer of information through the block transfer control apparatus 18 when the lead 39 is at a high potential. A cathode follower 40 is employed between the flip-flop and the lead 39 to provide isolation. The lead 39 is at low potential when the flip-flop is set to its "0" condition, and the lead is at high potential when the flip-flop is in its "1" condition.

The output of the coincidence circuits is applied over a lead 42 to a gate 43. The coincidence circuits serve to cause the lead 42 to be at high potential for the duration of one count each time that modulo 200 and modulo 20 coincidence results. The high potential on lead 42 serves to open the gate 43 to pass one sector pulse from the pulse generator 20 to another pulse generator 44. The pulse generator 44 produces a pulse in response to the sector pulse, and the pulse is applied over a lead 45 and through a gate 46 to still another pulse generator 47. The gate 46 is open when the lead 39 is high. The output of the pulse generator 47 is applied over a lead 48 to set the flip-flops 30 and 38 to "0." The pulse output of the generator 44 is also applied over a lead 50 to set the flip-flop 34 to "0," and over a lead 51 to set the flip-flop 38 to "1." A gate 52 is employed in the lead 51, and the gate is open only when the lead 39 is at low potential; i.e., when the flip-flop 38 is in its "0" state.

A switch 60 serves to apply a sector pulse to set the flip-flops 30 and 34 to "1." A mechanical switch is shown in order to simplify the disclosure. However, an electronic switching arrangement may be employed in order to provide high speed operation.

After each block transfer the flip-flops 30, 34 and 38 are all in their "0" state, so that the leads 31 and 39 are at low potential and the lead 35 is at high potential.

In operation, the address of the block of information to be transferred is shifted into the address register 25, and then the switch 60 is closed just long enough to pass one sector pulse.

The sector pulse serves to set the flip-flops 30 and 34 to their "1" state so that the lead 31 is at high potential to activate the coincidence circuits and the lead 35 is at low potential so that the modulo 200 coincidence circuit is not de-activated. The lead 39 remains at low potential at this time to prevent the transfer of information through the block transfer control apparatus 18.

When modulo 200 coincidence is achieved between the address register and the sector counter, the coincidence circuits cause the lead 42 to be at high potential for the duration of one count in the sector counter so as to permit one sector pulse to be transmitted through the gate 43 to the pulse generator 44.

The pulse produced by the generator 44 is applied over the lead 51 and through the gate 52 to set the action flip-flop 38 to its "1" state. This causes the lead 39 to be at high potential, thereby initiating the transfer of information through the block transfer control apparatus 18 and also opening the gate 46. The pulse produced by the generator 44 is also applied over the lead 50 to set the flip-flop 34 to its "0" state, thereby causing the lead 35 to be at high potential so that the modulo 200 coincidence circuit is deactivated. The first pulse which is applied by the generator 44 over the lead 45 has no effect because the gate 46 is closed at that instant.

When a block of twenty words has been transferred through the block transfer control apparatus 18, modulo 20 coincidence occurs between the address register and the sector counter. The coincidence circuits 26 cause the lead 42 to be at high potential again for the duration of one count in the sector counter so as to permit a second sector pulse to be transmitted through the gate 43 to the pulse generator 44.

The second pulse produced by the generator 44 has no effect upon the flip-flop 34 because it is already in its "0" state, and it also has no effect upon the flip-flop 38 because the gate 52 is closed. However, this second pulse is transmitted through the gate 46 to the pulse generator 47. The pulse produced by the generator 47 sets the flip-flops 30 and 38 to their "0" states, thereby causing the leads 31 and 39 to be at low potential to cause the coincidence circuits to be de-activated and also causing the block transfer control apparatus 18 to terminate the transfer of information.

Thus, the first control signal from the coincidence circuits serves to initiate the block transfer of information when modulo 200 coincidence occurs, and the second control signal from the coincidence circuits serves to terminate the transfer of information when modulo 20 coincidence occurs.

Fig. 4 is a schematic diagram of a coincidence circuit suitable for use in the apparatus of Fig. 1.

The nine flip-flops of the sector counter 24 and the corresponding nine flip-flops of the address register 25 are shown as block diagrams. In the sector counter, the "1" side of the respective flip-flops is represented by the letter Y and a subscript denoting the flip-flop number. The "0" side of the respective flip-flops is represented by Y′ and the required subscript. When a flip-flop is in the "0" state, the Y′ lead is at high potential, and when the flip-flop is in the "1" state, the Y lead is at high potential.

The flip-flops of the address register 25 are designated in a corresponding manner, using the letter X.

The modulo 20 portion of the coincidence circuits comprises five gate or comparator tubes 70 to 74, corresponding to the numbers 1, 2, 4, 8 and 10, and the modulo 200 portion comprises four gate or comparator tubes 75 to 78, corresponding to the numbers 20, 40, 80 and 100. Each comparator tube circuit is provided with four diodes and arranged so that the cathode of the tube is at low potential, except when the pair of X and Y leads or the pair of X′ and Y′ leads is at high potential.

Thus, the comparator tubes serve to compare the state of activation of corresponding flip-flops in the sector counter and the address register, and when corresponding flip-flops are in the same state, the cathode of the corresponding comparator tube goes high.

A gate tube 80 is coupled to the cathodes of the modulo 20 comparator tubes through five diodes, and the circuit is arranged so that the cathode of the tube 80 is at high potential only when all of the cathodes of the tubes 70 to 74 are high. Another gate tube 82 is controlled by the potentials on the lines 31, 83 and 84, so that its cathode, and hence the line 42 which controls the gate 43, is at high potential only when the lines 31, 83 and 84 are at high potential.

A gate tube 88 is coupled to the cathodes of the modulo 200 comparator tubes through four diodes, and the circuit is arranged so that the cathode of the tube 88 is at high potential only when all of the cathodes of the tubes 75 to 78 are high or when the lead 35 is at high potential.

Following the examples described with respect to Figs 1 to 3, the lead 31 from the access flip-flop is at high potential while coincidence is being achieved in both the modulo 200 and the modulo 20 circuits. The lead 35 from the loop/main flip-flop is at low potential until modulo 200 coincidence is achieved and then it goes high. For the address 118, the 8, 10 and 100 flip-flops of the address register are actuated to the "1" state so that the leads $X_8$, $X_{10}$ and $X_{100}$ and the leads $X'_1$, $X'_2$, $X'_4$, $X'_{20}$, $X'_{40}$ and $X'_{80}$ are at high potential. Until modulo 200 coincidence is attained, the cathode of at least one of the comparator tubes 70 to 78 is at low potential and either or both the leads 83 and 84 are at low potential. Hence, the lead 42 is at low potential.

When the flip-flops of the sector counter are in the same actuated condition as the flip-flops of the address register, the cathodes of all the tubes 70 to 78 go high. For this condition the leads 83 and 84 are both at high potential. Since the lead 31 remains high throughout this operation, the lead 42 at the cathode of the tube 82 goes high until the next count is registered in the sector counter.

The signal on lead 42 serves to initiate the block transfer of information and to cause the line 35 to be at high potential, as explained with reference to Fig. 1.

The high potential on the line 35 causes the cathode of the tube 88 and hence the line 84 to be at high potential. This deactivates the modulo 200 portion of the circuit, and the next signal on the lead 42 is produced by the action of the modulo 20 portion of the circuit.

The cathode of at least one of the tubes 70 to 74 is at low potential until the sector counter registers 138, whereupon coincidence is achieved and the cathodes of all of these tubes go high. This causes the lead 83 to go high again until the next count is registered in the sector counter. Since the leads 31 and 84 were maintained high, modulo 20 coincidence causes the cathode of the tube 82 and hence the lead 42 to be at high potential again.

This second signal on lead 42 serves to terminate the block transfer of information and to reset the coincidence control apparatus.

The coincidence control arrangement of this invention may be employed in other counting arrangements provided all of the pairs of flip-flops attain coincidence at one count and then a portion of the pairs of flip-flops attain coincidence a second time at a count which is a predetermined number different from the first count.

Figs. 5 and 6 illustrate such a coincidence control arrangement based upon modulo 100 and modulo 10 coincidence. Fig. 5 shows how modulo 100 coincidence is attained by comparing the states of the 1, 2, 4, 8, 10, 20, 40 and 80 flip-flops in an address register and in a sector counter. Then modulo 10 coincidence is attained by comparing the states of the 1, 2, 4 and 8 flip-flops, as shown in Fig. 6.

The arrangement of Figs. 5 and 6 is primarily suitable for use in transferring a block of 10 words in systems employing 100 addresses.

I claim:

1. Apparatus for controlling the transfer of a predetermined block of information from a storage medium, comprising a movable member having a plurality of addressed locations and a block of information recorded along a selected portion of the member, means for registering a reference address representing the location of the information along the selected portion, a counter coupled to the member for registering a series of addresses representing the position of the movable member, both the registering means and the counter having flip-flops for providing binary representations of numbers in the 1, 2, 4, 8 system of binary coded decimal representation, means for comparing the actuated condition of all the corresponding flip-flops in the registering means and the counter to initiate the transfer of information from the selected portion when coincidence is attained between all the flip-flops of the counter and the corresponding flip-flops of the registering means, and means for comparing the actuated condition of a predetermined portion of the corresponding flip-flops in the registering means and the counter to terminate the transfer of information from the selected portion when coincidence is attained among that portion of the flip-flops in the registering means with the corresponding flip-flops of the counter.

2. Apparatus for controlling the transfer of a predetermined block of information from a storage medium, comprising a movable member having a plurality of addressed locations and a block of information recorded along a selected portion of the member, an address register for registering an address representing the location of the information along the selected portion, a counter coupled to the member for registering a series of addresses representing the position of the movable member, the address register and the counter having flip-flops for registering addresses, a coincidence circuit having comparator circuits coupled to corresponding pairs of flip-flops in the address register and the counter for providing a control signal when the flip-flops in the address register and the counter are actuated to represent the same address, means responsive to the control signal for de-activating a portion of the comparator circuits and altering the action of the coincidence circuit to provide a second control signal when the address registered in the counter is equal to a predetermined number greater than the address registered in the address register, and control means coupled to the coincidence circuit and responsive to the first and second control signals for causing information to be transferred from the selected portion during the interval of time between the two control signals.

3. Apparatus for controlling the transfer of a predetermined block of information from a selected portion of a magnetic drum, comprising a rotatable drum having a plurality of addressed locations and a block of information recorded along a portion of a band extending around the drum, an address register for registering an address representing the location of the information in the band, a counter coupled to the drum for registering a series of addresses representing the angular position of a reference location on the drum, the address register and the counter having flip-flops for registering addresses, a coincidence circuit having comparator circuits coupled to corresponding pairs of flip-flops in the address register and the counter for providing a control signal when the flip-flops in the address register and the counter are actuated to represent the same address, means responsive to the control signal for de-activating a portion of the comparator circuits and altering the action of the coincidence circuit to provide a second control signal when the address registered in the counter is equal to a predetermined number greater than the address registered in the address register, and control means coupled to the coincidence circuit and responsive to the first and second control signals for causing information to be transferred from the band during the interval between the two control signals.

4. A control circuit which comprises a register for registering signals corresponding to a reference number, a counter which is adapted to provide a sequence of registrations corresponding to a series of counts, the register and the counter providing binary representations of numbers in the 1, 2, 4, 8 system of binary coded decimal representation, a coincidence circuit coupled to the register and the counter for providing a control signal when the registration in the counter equals the registration in the register, and means for altering the action of the coincidence circuit to provide a second control signal when the registration in the counter is a predetermined number greater than the registration in the register.

5. A control circuit which comprises an address register for registering signals corresponding to a reference number, a counter which is adapted to provide a sequence of registrations corresponding to a series of counts, the register and the counter each having flip-flops representing the numbers 1, 2, 4, 8, 10, 20, 40, 80 and 100 for providing binary coded decimal representations of numbers, a coincidence circuit coupled to the flip-flops of the register and the counter for providing a control signal when the flip-flops in the register and the counter are in the same condition, and means for altering the action of the coincidence circuit to provide a second control signal when the registration in the counter is twenty greater than the registration in the address register.

6. A control circuit which comprises an address register having sixteen flip-flops for registering signals corresponding to a reference number to four places in the 1, 2, 4, 8 system of binary coded decimal representation, a counter having nine flip-flops which is adapted to provide a sequence of registrations corresponding to a series of counts to three places in the 1, 2, 4, 8 system of binary coded representation, a coincidence circuit coupled to the nine flip-flops of the counter and to the corresponding nine flip-flops of the address register for providing a control signal when the corresponding flip-flops in the counter and the register are in the same condition, and means responsive to said control signal for altering the action of the coincidence circuit to provide a second control signal when the registration in the counter corresponds to twenty greater than the reference number corresponding to the registration in the address register.

7. A control circuit which comprises an address register for registering signals corresponding to a reference number, a counter which is adapted to provide a sequence of registrations corresponding to a series of counts, the register and the counter each having flip-flops representing the numbers 1, 2, 4, 8, 10, 20, 40, 80 and 100 for providing binary coded decimal representations of numbers, a coincidence circuit having nine comparator circuits with the respective comparator circuits being coupled to corresponding flip-flops of the register and the counter for providing a control signal when the flip-flops in the register and the counter bear the same registration, and means responsive to the control signal for de-activating the comparator circuits for the flip-flops representing the numbers 20, 40, 80 and 100 and altering the action of the coincidence circuit to provide a second control signal when the registration in the counter corresponds to a number which is twenty greater than the reference number corresponding to the registration in the address register.

8. A control circuit comprising a register for storing a multi-digit number in electrically coded form, a counter adapted to provide a sequence of multi-digit numbers stored in electrically coded form, means for sequentially counting the counter, means for comparing each of the electrically coded digits in the register with the electrically coded digits in the counter as the counter is sequentially counted, means for generating an electrical signal in response to a coincident condition between all corresponding digits as stored in electrically coded form in the register and the counter, means responsive to said coincidence indicating signal for further comparing a predetermined portion of the electrically coded digits in the counter with a corresponding portion of the electrically coded digits stored in the register as the counter is continued to be counted, and means for generating an electrical signal in response to a coincident condition between the predetermined portions of the digits stored in electrically coded form in the register and the counter.

References Cited in the file of this patent

UNITED STATES PATENTS

| | | |
|---|---|---|
| 2,564,403 | May | Aug. 14, 1951 |
| 2,609,439 | Marshall | Sept. 2, 1952 |
| 2,611,813 | Sharpless | Sept. 23, 1952 |
| 2,639,859 | Serrell | May 26, 1953 |
| 2,679,638 | Bensky et al. | May 25, 1954 |

OTHER REFERENCES

Publication: "5th Interim Progress Report on the Physical Realization of an Electronic Computing Instrument," published by Princeton, N.J. Institute for Advanced Study, January 1949.

"24 Digit Parallel Computer With Magnetic Drum Memory," Feb. 15, 1949, by Era, pages 27 through 30. Figs. 3.2–2; 3.3–4; 3.3–5; 3.3–9. (Report cited in "High Speed Computing Devices," page 219, by Era, McGraw-Hill, 1950.)

"Proc. of Conference on Automatic Computing Machinery," Dept. of Elec. Engrg, University of Sydney, Australia, pub. April 1952, pp. 163–171, Figs. 1 to 5.

"The Physical Realization of an Electronic Digital Computer," December 1950, by A. D. Booth Electronic Engrg. (pages 492 to 498).

"Design Features of the Era 1101 Computer" by F. C. Mullaney from "Rev. of Electronic Dig. Comp.," Joint AIEE-IRE Conference, pp. 43 to 48. (Copy in Div. 23.)